US008807421B2

(12) United States Patent (10) Patent No.: US 8,807,421 B2
Johnson (45) Date of Patent: Aug. 19, 2014

(54) COMPOSITE CODE WITH DYNAMIC LINKING TO INTERNET ADDRESSES

(76) Inventor: Michael Alexander Johnson, Scottsdale, AZ (US)

( * ) Notice: Subject to any disclaimer, the term of this patent is extended or adjusted under 35 U.S.C. 154(b) by 129 days.

(21) Appl. No.: 13/456,078

(22) Filed: Apr. 25, 2012

(65) Prior Publication Data

US 2012/0278465 A1 Nov. 1, 2012

Related U.S. Application Data

(60) Provisional application No. 61/479,285, filed on Apr. 26, 2011, provisional application No. 61/541,517, filed on Sep. 30, 2011.

(51) Int. Cl.
*G06F 17/00* (2006.01)
*G06Q 50/00* (2012.01)
*G06F 17/30* (2006.01)
*G06F 7/00* (2006.01)

(52) U.S. Cl.
USPC .......................... 235/375; 705/313; 707/769

(58) Field of Classification Search
USPC ................... 235/375; 705/313; 707/769–780
See application file for complete search history.

(56) References Cited

U.S. PATENT DOCUMENTS

| | | | |
|---|---|---|---|
| 5,869,819 A * | 2/1999 | Knowles et al. | 235/375 |
| 6,505,776 B1 * | 1/2003 | Wilz et al. | 235/462.01 |
| 6,871,780 B2 * | 3/2005 | Nygren et al. | 235/375 |
| 6,959,286 B2 * | 10/2005 | Perkowski | 705/26.62 |
| 7,441,706 B1 * | 10/2008 | Schuessler et al. | 235/462.15 |
| 7,747,636 B1 * | 6/2010 | Price et al. | 707/758 |
| 7,774,268 B2 * | 8/2010 | Bradley | 705/38 |
| 7,921,180 B2 * | 4/2011 | Greer et al. | 709/217 |
| 7,963,446 B2 * | 6/2011 | Harris | 235/462.01 |
| 2002/0113127 A1 * | 8/2002 | Takeuchi et al. | 235/462.25 |
| 2002/0140988 A1 | 10/2002 | Cheatle et al. | |
| 2005/0109846 A1 | 5/2005 | Lubow | |
| 2006/0161474 A1 * | 7/2006 | Diamond et al. | 705/14 |
| 2007/0210159 A1 * | 9/2007 | Mott et al. | 235/435 |
| 2009/0140035 A1 * | 6/2009 | Miller | 235/375 |
| 2009/0150251 A1 * | 6/2009 | Zhitomirsky | 705/26 |
| 2009/0316199 A1 * | 12/2009 | Yoshimura et al. | 358/1.15 |
| 2011/0053639 A1 * | 3/2011 | Etienne Suanez et al. | 455/556.1 |
| 2011/0137706 A1 * | 6/2011 | Howard et al. | 705/7.29 |
| 2011/0231296 A1 * | 9/2011 | Gross et al. | 705/37 |
| 2011/0283196 A1 * | 11/2011 | Berger et al. | 715/738 |
| 2012/0095882 A1 * | 4/2012 | Wolff | 705/27.2 |
| 2012/0278465 A1 * | 11/2012 | Johnson | 709/223 |

* cited by examiner

*Primary Examiner* — Lance L Barry
(74) *Attorney, Agent, or Firm* — Quarles & Brady LLP

(57) ABSTRACT

A composite code is created from an image and a tag that is searchable by an Internet search engine. The composite code is dynamically linked to one or more of a plurality of Internet addresses. When data about a composite code is received from a user computing device, one of the linked Internet addresses is selected based on a predetermined rule and sent back to the user computing device.

8 Claims, 11 Drawing Sheets

COMPOSITE CODE WITH DYNAMIC LINKING TO INTERNET ADDRESSES

CROSS-REFERENCES TO RELATED APPLICATIONS

This application claims priority to, and the benefit of, U.S. Patent Application Ser. No. 61/479,285, entitled "Composite Code With Dynamic Linking To Internet Addresses," filed Apr. 26, 2011, the entire contents of which are incorporated herein by reference; and this application also claims priority to and the benefit of U.S. Patent Application Ser. No. 61/541,517, entitled "Internet Profile Directory," filed Sep. 30, 2011, the entire contents of which are incorporated herein by reference.

FIELD

Embodiments generally relate to apparatuses, methods, devices, and systems for web access, and more particularly, to apparatuses, methods, devices, and systems to facilitate access to content on the Internet.

BACKGROUND

Vendors, such as retailers, businesses, or manufacturers, spend a large amount of their advertising budget to attract visitors to their websites. However, as their business grows or their inventory is replaced with new goods and services, the information on their respective websites becomes stale. The vendors, in turn, may redesign their websites, often requiring new Uniform Resource Locators (URLs) and corresponding marketing materials, which is expensive.

Accordingly, it would be an advance in the art of commerce to provide solutions that can help facilitate access to updated website content on the Internet.

SUMMARY

In certain embodiments, an identifier for a composite code is stored, wherein the composite code includes a tag and an image and the identifier includes the tag. The identifier is associated with a plurality of Internet addresses that each lead to a corresponding website.

In certain embodiments, a method for associating a composite code to a plurality of Internet addresses includes storing an identifier for the composite code, wherein the composite code includes an image and a tag and the identifier includes the tag. The identifier is associated with each of a plurality of Internet addresses leading to respective websites. Each of the Internet addresses include the tag and a corresponding characteristic of the respective website. A transmission including the identifier is received from a user computing device. The identifier and a predetermined rule are used to select one of the Internet addresses. The user computing device is redirected to the selected Internet address.

In certain embodiments, a computer program product encoded in a computer readable medium and comprising computer readable program code useable for associating a composite code to a plurality of Internet addresses. The computer program product includes computer readable program code that causes a processor to store an identifier for the composite code, wherein the composite code includes an image and a tag and the identifier includes the tag. The computer program product includes computer readable program code that causes a processor to associate the identifier with each of a plurality of Internet addresses each leading to a respective website. The computer program product includes computer readable program code that causes a processor to create Internet addresses to include the tag and a corresponding characteristic of the respective website. The computer program product includes computer readable program code that causes a processor to receive a transmission including the identifier from a user computing device. The computer program product includes computer readable program code that causes a processor to use the identifier and a predetermined rule to select one of the Internet addresses. The computer program product includes computer readable program code that causes a processor to send the user computing device the selected Internet address.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION

The invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in certain embodiment," and similar language throughout this specification may, but do not necessarily, all refer to the same embodiment. It is noted that, as used in this description, the singular forms "a," "an" and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
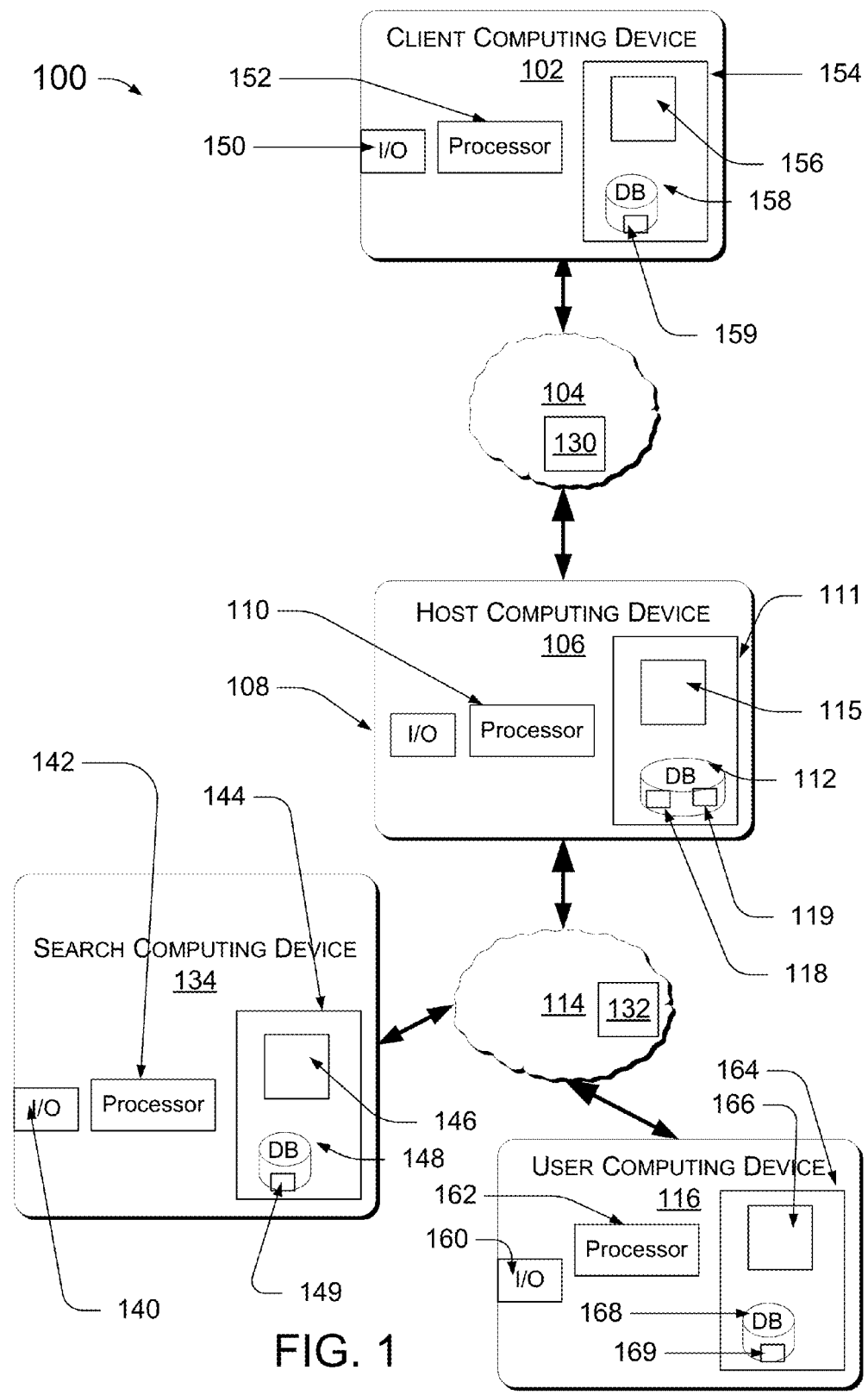
FIG. 1 illustrates Applicant's system.

Referring now to FIG. 1, computing device 106 comprises a processor 110 and a non-transitory computer readable medium 111. Applicant's computer readable program code 115 is encoded in computer readable medium 111. In certain embodiments, processor 110 (e.g., programmable processor) utilizes Applicant's computer readable program code 115 to store an identifier of a composite code 202 (FIG. 2), where the identifier and the composite code 202 both include one or more keywords and/or tag metadata. The keywords or tags, when visible with the image, provide notice to users of the potential data associated with the image. For example, a tag is included within an identifier that is a Uniform Resource Locator (URL) for an Internet address and the tag is included in a composite code that further includes at least one of an image, a text message, a Global Positioning System location, and a call Voice Over IP or PBX system. The keywords or tags are, in turn, searchable and indexable. In certain embodiments, the keywords or tags are searchable and indexable by Internet search engines, which affect a search ranking of the composite code and corresponding identifier.

Figure 7:
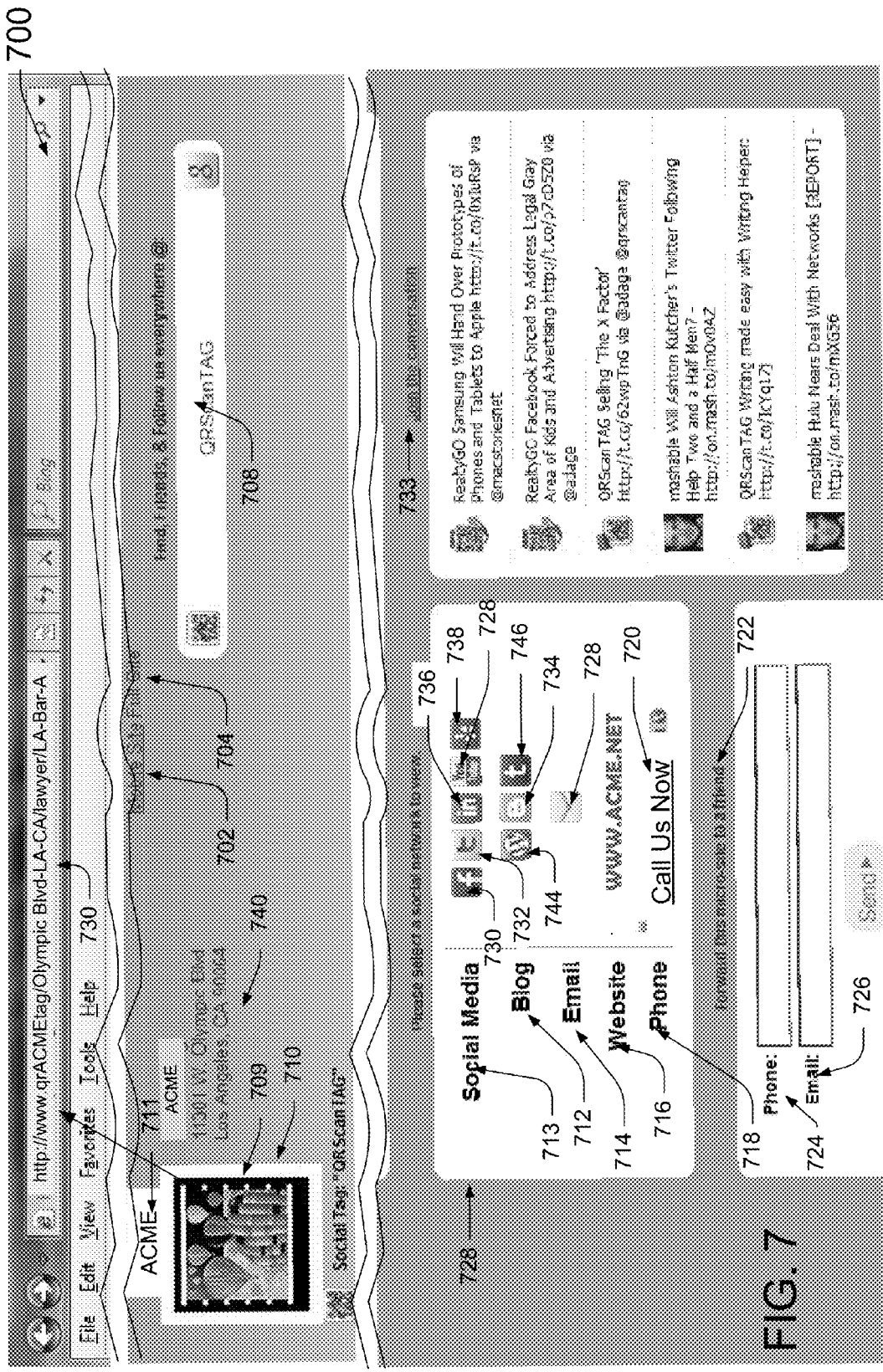

In certain embodiments, the processor 110 creates the composite code including associating a keyword or tag (see FIG. 2 keyword 204 or FIG. 7 keyword 711) with an image such as a 2D/3D Quick Response Code (see FIG. 2 QR Code 206) or a barcode (see FIG. 7 shown as a High Capacity Color Barcode with colored triangles 709).

In certain embodiments, processor 110 utilizes Applicant's computer readable program code 115 to store a profile that includes and/or is associated with one or more keywords and/or tag metadata and/or images that are searchable and indexable by Internet search engines. The keywords or tags, in turn, affect a search ranking of the website that includes the data from the client's profile.

Referring to FIG. 1, a system 100 for providing content to users is illustrated. Here, composite codes or profiles are created, corresponding identifiers received, stored, and/or accessed. In the illustrated embodiment of FIG. 1, system 100 comprises a host computing device 106 that is communicatively connected to a computing device 102 through a first communication fabric 104; and a computing device 116 and/or a computing device 134 through a second communication fabric 114.

In certain embodiments, the computing device 102 represents one or more computing devices that are owned and/or operated by a client (e.g., client computing device 102); the computing device 106 represents one or more computing devices that are owned and/or operated by a host (e.g., host computing device 106); the computing device 116 represents one or more computing devices that are owned and/or operated by a user (e.g., user computing device 116); and the computing device 134 represents one or more computing devices that are owned and/or operated by a search engine operator (e.g., search computing device 134). In certain embodiments, the computing device 102 is also the computing devices 116 and/or 134. Here, a single computing device 102 is owned and/or operated by each of the client, the user, and/or the search engine operator and the communication fabrics 104 and 114 area the same communication fabric.

For the sake of clarity, FIG. 1 shows a single client computing device 102, host computing device 106, user computing device 116, and search computing device 134. FIG. 1 should not be taken as limiting. Rather, in other embodiments any number of entities and corresponding devices can be part of the system 100, and further, although FIG. 1 shows two communication fabrics 104 and 114, in other embodiments more or less than two communication fabrics could be provided in the system 100.

In certain embodiments, the client computing device 102, the host computing device 106, the search computing device 134, and the user computing device 116 are each an article of manufacture. Examples of the article of manufacture include: a server, a mainframe computer, a mobile telephone, a personal digital assistant, a personal computer, a laptop, a set-top box, an MP3 player, an email enabled device, a tablet computer, a web enabled device having one or more processors, or other special purpose computer (e.g., a Central Processing Unit, a Graphical Processing Unit, or a microprocessor) that is configured to execute an algorithm (e.g., a computer readable program or software) to receive data, transmit data, store data, or performing methods. Each of the client computing device 102, the host computing device 106, the search computing device 134, and the user computing device 116 includes a non-transitory computer readable medium having a series of instructions, such as computer readable program steps encoded therein. In some embodiments, the non-transitory computer readable medium includes one or more data repositories.

By way of example, the host computing device 106 is shown including a processor 110, a non-transitory computer readable medium 111 having a series of instructions, such as computer readable program steps encoded therein, an input/output means 108 (e.g., a keyboard, a mouse, a stylus, touch screen, a camera, a scanner, or a printer) and a data repository DB 112. The processor 110 accesses Applicant's computer readable program code 115 encoded on the non-transitory computer readable medium 111, and executes one or more instructions 118 to, for example, electronically communicate with the user computing device 116 or the client computing device 102.

By way of example, the client computing device 102 is shown including a processor 152, a non-transitory computer readable medium 154 having a series of instructions, such as computer readable program steps encoded therein, an input/output means 150 (e.g., a keyboard, a mouse, a stylus, touch screen, a camera, a scanner, or a printer) and a data repository DB 158. The processor 152 accesses Applicant's computer readable program code 156 encoded on the non-transitory computer readable medium 154, and executes one or more instructions 159 to, for example, electronically communicate with the host computing device 106 via communication fabric 104.

By way of example, the user computing device 116 is shown including a processor 162, a non-transitory computer readable medium 164 having a series of instructions, such as computer readable program steps encoded therein, an input/output means 160 (e.g., a keyboard, a mouse, a stylus, touch screen, a camera, a scanner, or a printer) and a data repository DB 168. The processor 162 accesses Applicant's computer readable program code 166 encoded on the non-transitory computer readable medium 164, and executes one or more instructions 169 to, for example, electronically communicate with the host computing device 106 via communication fabric 114.

By way of example, the search computing device 134 is shown including a processor 142, a non-transitory computer readable medium 144 having a series of instructions, such as computer readable program steps encoded therein, an input/output means 140 (e.g., a keyboard, a mouse, a stylus, touch screen, a camera, a scanner, or a printer) and a data repository DB 148. The processor 142 accesses Applicant's computer readable program code 146 encoded on the non-transitory computer readable medium 144, and executes one or more instructions 149 to, for example, electronically communicate with the host computing device 106 via communication fabric 114.

In certain embodiments, the client computing device 102, the host computing device 106, the search computing device 134, and the user computing device 116 each include wired and/or wireless communication devices which can employ various communication protocols including near field (e.g., "Blue Tooth") and/or far field communication capabilities (e.g., satellite communication or communication to cell sites of a cellular network) that support any number of services such as: Short Message Service (SMS) for text messaging, Multimedia Messaging Service (MMS) for transfer of photographs and videos, electronic mail (email) access, or Global Positioning System (GPS) service, for example. In certain embodiments, the client computing device 102, the host computing device 106, the search computing device 134, and the user computing device 116 employ hardware and/or software that supports accelerometers, gyroscopes, solid state compasses and the like.

In certain embodiments, a data repository comprises one or more hard disk drives, tape cartridge libraries, optical disks, combinations thereof, and/or any suitable data storage medium, storing one or more databases, or the components thereof, in a single location or in multiple locations, or as an array such as a Direct Access Storage Device (DASD), redundant array of independent disks (RAID), virtualization device, . . . etc. In certain embodiments, the data repository is structured by a database model, such as a relational model or a hierarchical model. Here, the data repository DB 118 stores profiles of the clients, their corresponding web content, or information about the client's marketing scope, duration, . . . etc., as attributes or tuples in an array The communication fabrics 104 and 114 comprise one or more switches 130 and 132, respectively. In certain embodiments, the communication fabrics 104 and 114 comprise the Internet, an intranet, an extranet, a storage area network (SAN), a wide area network (WAN), a local area network (LAN), a virtual private network, a satellite communications network an interactive television network, or any combination of the foregoing. In certain embodiments, the communication fabrics 104 and 114 contain either or both wired or wireless connections for the transmission of signals including electrical connections, magnetic connections, or a combination thereof. Examples of these types of connections are known in the art and include: radio frequency connections, optical connections, telephone links, a Digital Subscriber Line, or a cable link. Moreover, communication fabrics 104 and 114 utilize any of a variety of communication protocols, such as Transmission Control Protocol/Internet Protocol (TCP/IP), for example.

In certain embodiments, one or more of the communication fabrics 104 and 114 include a wireless radio frequency (e.g., 120 kHz-10 GHz, such as at 13.56 MHz) communication fabric at rates ranging from about 106 Kbit/second to about 848 Kbits/second between a computing device and an object, such as a composite code having circuitry and an antenna. Here, one or more of the computing devices, such as the user computing device 116, includes a radio frequency transceiver ("interrogator") configured to read electromagnetic fields that transfer data from the object and radio frequency software or middleware to interpret the received data. The object includes an integrated circuit and an antenna for receiving and transmitting signals and optionally a battery. Here, the user computing device 116 transmits radio signals to interrogate the object. The object responds to the signal from the user computing device 116 with the data associated with the object (e.g., an identifier of the object).

To illustrate, the user computing device 116, which is a smart phone with an antenna, transmits an electromagnetic signal proximal (e.g., between about 5 mm to 30 meters) to an object which is a composite code having a radio frequency circuit and antenna. The object responds to the electromagnetic signal by transmitting radio waves encoded with data associated with the composite code, such as a URL, back to the user computing device 116. The user computing device 116, in turn, uses the radio frequency software to interpret the data received from the composite code and recognize it as a URL, for example.

In certain embodiments, the object is at least one of passive, active, or semi-active. A passive object is powered by the electromagnetic fields used to read it. An active object has an on-board battery that intermittently transmits the data associated with the object. A semi-active object has an on-board battery that is activated when the radio frequency transceiver is within its proximity.

In certain embodiments, the object is read-only in which the data associated with the object is static and does not change when interrogated by a computing device, such as the user computing device 116. Alternatively, or in combination, the object is a read/write object in which the data associated with the object is augmented when interrogated by a computing device, such as the user computing device 116.

In certain embodiments, the search computing device 134 includes a search engine capable of conducting web crawling, for example, to browse websites on the Internet and produce search results for search terms. For example, the search computing device 134 creates and saves copies of web pages that are indexed for future searches for search terms. The search computing device 134 can determine a frequency of inlinking, which affect a ranking of the corresponding website in a search result.

One or more portions of the system 100 can be implemented as a web-based software application. Although not shown, in some embodiments, at least one or more portions of the system 100 can be implemented as a software and/or hardware module that can be locally executed on one or more of the client computing device 102, the host computing device 106, the search computing device 134, and the user computing device 116. In such instances, other functionality of the system 100 can be accessed via the communication fabrics 104 and 114. For example, a software application locally installed at the user computing device 116 can be used to access at least a portion of the system 100.

One or more portions of the 100 can include a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with, for example, the system 100 can be performed by different modules and/or combined into one or more modules. In certain embodiments, such modules are be implemented as a hardware circuit comprising custom VLSI circuits or gate arrays, off-the-shelf semiconductors such as logic chips, transistors, or other discrete components. For example, a module is implemented in programmable hardware devices such as field programmable gate arrays, programmable array logic, programmable logic devices, or the like. Alternatively, or in combination, one or more modules are implemented in software for execution by various types of processors. An identified module of executable code, for instance, comprise one or more physical or logical blocks of computer instructions which, for instance, organized as an object, procedure, or function. Nevertheless, the executables of an identified module need not be physically collocated, but are comprise, in certain embodiments, disparate instructions stored in different locations which, when joined logically together, comprise the module and achieve the stated purpose for the module.

By way of example, the processors 152 and 116 access corresponding Application Program Interfaces (APIs) encoded on the corresponding non-transitory computer readable mediums (154 and 164, respectively), and execute instructions (e.g., 159 and 169, respectively) to electronically communicate with the computing device 106.

Figure 2:
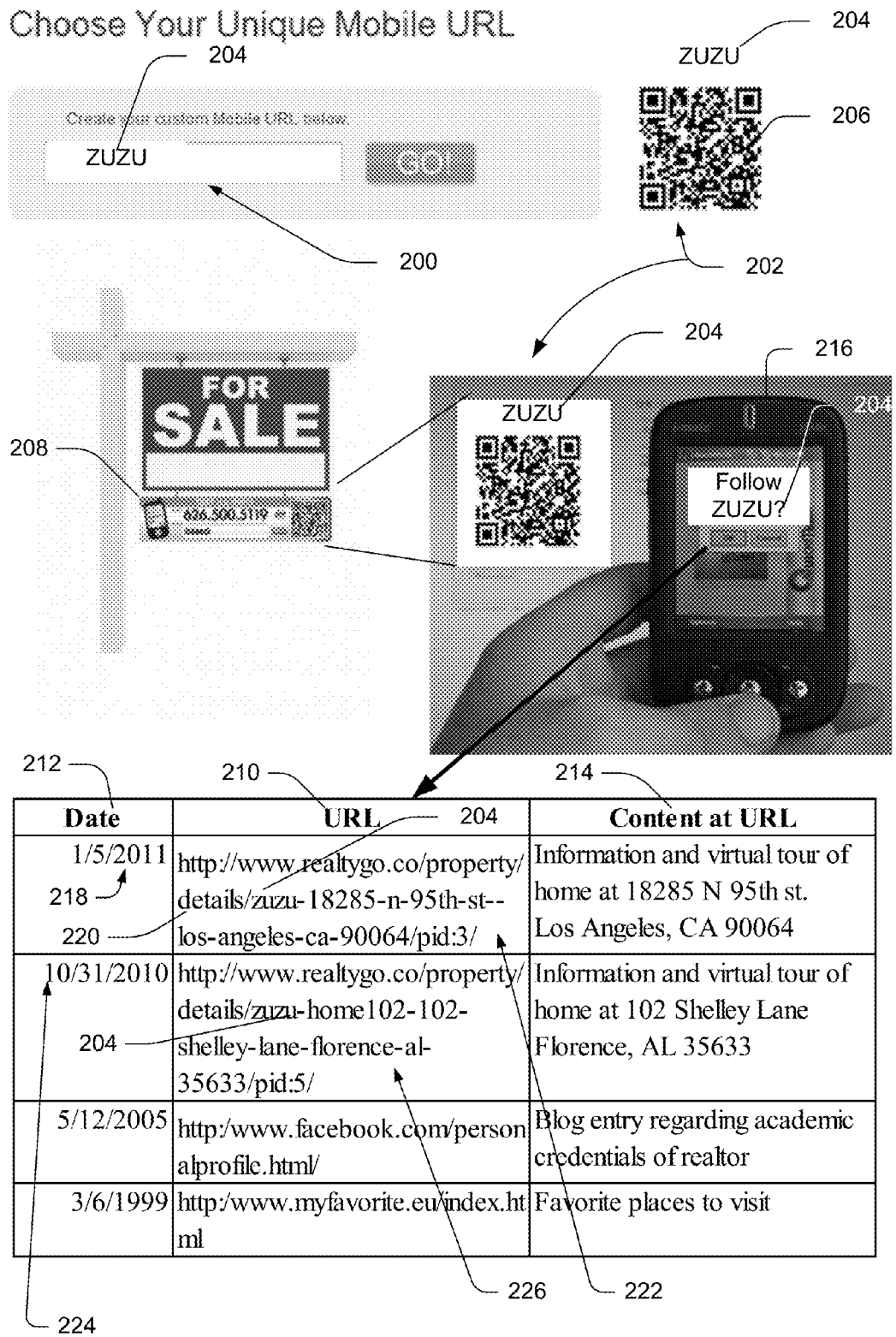
FIG. 2 is a schematic representing composite code linkages to a plurality of Internet addresses.

Referring to FIG. 2, a schematic includes a composite code 202. The composite code 202 includes a QR code 206 that is associated with the tag ZUZU 204. For example, the QR code 206 is stored in the data repository DB 118, such as a relational database, in association with the tag ZUZU 204.

The composite code provides a hardlink from a physical world to a virtual world, such as the Internet. To illustrate, the composite code 202 is scannable by the client computing device 102 or the user computing device 116 that, in turn, is directed to an Internet address.

In certain embodiments, the keywords or tags, when visible with the image, provide notice to users of the potential data associated with the image. For example, if the client, a company, uses its trademark as the keyword or tag associated with an image in its composite code, then the user receives notification that the composite code is associated with the company. Alternatively, or in combination, the composite code is associated with other elements that provide notice to the user of the functionality of the composite code. To illustrate, in certain embodiments the keyword or tag includes an image or icon such as a schematic of a phone to indicate that scanning the composite code will automatically dial a number. Other icons or schematics are also contemplated, such as a certification mark that indicates the company associated with the composite code meets certain standards . . . etc. In other embodiments, the keyword or tag includes a text messaging capability, such as by allowing a user or client to enter information into a window above the image.

Referring to the example illustrated in FIG. 2, a schematic illustrates a composite code 202 that is dynamically linked to a plurality of Internet addresses 210. Here, the host computing device 106 creates the composite code 202 by receiving a keyword or tag "ZUZU" from client computing device 102. For example, the client computing device 102 accesses a website to entered "ZUZU" 204 into a query box 200 displayed via browser on the client computing device 102 (not shown). The keyword is, in turn, received at the host computing device 106. The host computing device 106 creates the composite code 202 that includes the keyword ZUZU 204 and the image, which is shown as QR Code 206 in FIG. 2, and associates an identifier with the composite code 202, such as a URL a phone number or other Globally Unique Identifier.

The client, in turn, includes the composite code 202 in marketing materials of the client as a hardlink, allowing users to link from a physical world to a virtual world, such as scanning the QR Code of the composite code 202 that opens a browser access to the Internet. In FIG. 2, the composite code 202 is included in a marketing material that is on a real estate For Sale sign 208, shown with an enlarged call out of the composite code 202. In certain embodiments, the composite code is included in other forms of visual marketing materials such as by including the composite code on flyers, mailers, websites, brochures, booklets, magazines, business cards, store windows, signs, other printed or online materials, and the like.

As shown in FIG. 2, a user utilizes the user computing device 116, shown as smart phone 216, to scan the composite code 202 using an application stored on the user computing device 216. Alternatively, or in combination, the user computing device 116 utilizes a radio frequency transceiver to wirelessly transfer data (e.g., the identifier for the composite code) from the composite code 202 to the user computing device 116. Here, the user smart phone 216 includes a browser that supports URL redirection, which allows the composite code 202 to send the tag, keyword, the identifier, and/or other metadata to existing applications on the smart phone 216. In the example shown in FIG. 2, the application stored on the user smart phone 216 queries the user if the URL link associated with the composite code 202 should be followed.

In certain embodiments, the identifier of the composite code is a surrogate URL. A surrogate URL is a URL that is not linked to a website which is displayed on a user computing device 116; rather when scanned, the surrogate URL directs the user computing device 116 to the host computing device 106. The host computing device 106, in turn, receives the identifier of the composite code that is a surrogate URL and compares it with identifiers stored in its data repository DB 112 to find a match. When a match is found, a predetermined rule is used to select an Internet address associated with the identifier in the data repository DB 112 to redirect the user computing device 116.

In certain embodiments, the composite code is associated with a plurality of Internet addresses and dynamically linked to one or more of the Internet addresses based on predetermined rules encoded in Applicant's computer readable program code 115. For example, a predetermined rule for dynamically linking two Internet addresses to a composite code dictates that a first Internet address is linked to the composite code at a first date and a second Internet address is linked to the composite code at a second date. Here, a client uses a single composite code to trigger multiple marketing programs over time, switching content associated with the composite code as the client's desired browser rendition of web content to users changes.

In FIG. 2, the composite code 202 is associated with one or more Internet addresses, shown as Internet addresses 210, that each include a corresponding website with a respective content 214. In certain embodiments, the Internet addresses 210 include the keyword ZUZU 204 in their respective URLs. The content 214 in FIG. 2 relates to real estate, however, any web content is accessible via a composite code. By way of illustration and not limitation, the content is one of: a company's goods or services, entries on a social networking site, an anonymous blog or chat entry, a presentation, or an academic curriculum, for example.

As stated previously, predetermined rules determine which of the Internet addresses are linked to the composite code 202 for a particular user query. In certain embodiments, the predetermined rule is a function of a date 212 that the host computing device 106 receives the identifier of the composite code 202. To illustrate, when a user computing device 116 sends the identifier of the composite code 202 to the host computing device 106 at a first date (element 218), Applicant's computer readable program code 115 selects a first Internet address 222 to communicate to a user computing device 116. Alternatively, when a user computing device 116 sends the identifier of the composite code 202 to the host computing device 106 at a second date (element 224), Applicant's computer readable program code 115 selects a second Internet address 226 to communicate to a user computing device 116.

In certain embodiment, the predetermined rule is a function of data received from the user computing device 116, such as a locality of the user. For example, the host computing device 106 receives from the user computing device 116 the identifier of the composite code 202 and a Protocol (IP) address or a Global Positioning System (GPS) signal associated with a user computing device 116. Here, the received data indicates that the user that scanned the composite code is from a particular locality (e.g., California). The predetermined rule, in turn, uses the locality information to select the Internet address having content that would be most relevant to the user's location. For example, if a GPS signal from the user computing device 116 indicates that the user is located in California, then Applicant's computer readable program code 115 uses the predetermined rule to select and redirect the user computing device 116 to a California relevant website of the client. In contrast, if a second user from a different locality (e.g., New York) scans the same composite code, Applicant's computer readable program code 115 uses the received corresponding identifier of the composite code and the predetermined rule to select and redirect the second user to a New York relevant website.

In another embodiment, the data received from the user computing device 116 changes the content but not the Internet address of the website. Consequently, in the example above, both the California and the New York users would be redirected to the same Internet address, however, some of the content associated with the Internet address would be different between the two users. To illustrate, a contact phone number for California is included in the website rendered on the user computing device 116 of the California user while a New York contact phone number is included on the website rendered on the user computing device 116 of the New York user.

Similarly, in certain embodiments, Applicant's computer readable program code 115 associates the composite code 202 to one or more phone numbers. For example, Applicant's computer readable program code 115 dynamically links the composite code 202 of FIG. 2 to one or more phone numbers based on a predetermined rule (not shown). When the composite code 202 is scanned with a telephonic user computing device 116, a phone number selected based on the corresponding predetermined rule is uploaded to the user computing device, and is automatically dialed for voice or text communication.

In certain embodiments, the composite code is searchable and/or indexable by Internet search engines. For example, an Internet search engine can search the tag portion 204 of composite code 202 because the search algorithm of the search engine can identify tag 204 ("ZUZU") of composite code 202 and index tag 204 within its search, increasing the chance that the composite code 202 and/or its respective Internet address will appear in a corresponding search result. To illustrate, the tag or keyword of the composite code 202 is a trademark of a company or a description of the goods or services of a vendor or client (e.g., "Great Real Estate", "top 10 docs"). Here, a search for "real estates" using an Internet search engine produces results that include the composite code that is associated with the tag "Great Real Estate" because the tag "Great Real Estate" of the composite code is searched, indexed, and matched by the search engine, increasing the probability that the "Great Real Estate" composite code is listed in the corresponding search results.

Similarly, in certain embodiments, one or more surrogate URLs and/or Internet addresses associated with composite code 202 include the respective keywords or tags of the client that are searchable and/or indexable by Internet search engines. For example, the composite code is associated with a website having a URL that includes one or more of the characteristics of the content of the corresponding website. Typically, a URL has a domain name, a port number, a path, a query string, and a fragment identifier in the following format: "www.domain_name:port/path?query_string#fragment_identifier." Here, at least one of the domain name, a port number, a path, a query string, and a fragment identifier includes the characteristic of the content of the corresponding website and/or the keyword of the composite code. To illustrate, the composite code with a tag "Great Real Estate" is linked with a first Internet address: "http://www.realtygo.co/property/details/greatrealestate-18285-n-95th-st--los-angeles-ca-90064/pid:3/" for a California real estate. In this illustration, both the keyword Great Real Estate and the characteristic of the website content, the address 18285 North 95th Street, are included in the Internet address. A likelihood that a search engine searching for "Los Angeles homes" will result in the composite code "Great Real Estate" that links to the first Internet address is increased due, in part, to the description of the California real estate in the first Internet address.

Similarly, in this example, the corresponding composite code is associated with a second Internet address "http://www.realtygo.co/property/details/greatrealestate102-102-shelley-lane-florence-al-35633/pid:5" for an Alabama real estate. A likelihood that a search for "Alabama homes" will result in the composite code "Great Real Estate" that links to the second Internet address is increased due, in part, to the description of the Alabama real estate in the second Internet address. In certain embodiments, the host computing device 106 selects the characteristics from the content of the corresponding website to include in the respective Internet address.

Long Internet addresses need not be remembered or written down because the composite code is scannable by a computing device. Alternatively, or in combination, the long Internet address is given a nickname. For example, a nickname is used as a pointer that point to the full URL address (see, e.g., tinyurl 1126 of FIG. 11). The nickname, in turn, is indexable and searchable by Internet search engines.

In certain embodiments, elements of Applicant's composite code and associated Internet address(es) can, singly or in combination, promote higher ranking of the composite code within Internet search result, attracting more visitors to the corresponding content, and providing Search Engine Optimization (SEO). For example, the tag or keyword 204 of composite code 202 is searchable, improving the composite code's search ranking. The associated Internet addresses are searchable, improving the composite code's search ranking. Moreover, depending on the algorithm of the search engine, a search ranking of composite code 202 is improved based on a history of the composite code 202 during previous searches. For example, if the past history shows that user frequency of selection of composite code 202 from among a search result of a search engine is high, the search ranking of composite code 202 is also high. Here, the repeated use of a single composite code 202 for multiple Internet addresses increases its user selection over time, improving its popularity and, in turn, its search ranking.

In certain embodiments, the content of the client websites includes inlinking capabilities to further improve search ranking. The content provide links to other Internet addresses of the client that eventually link back to the composite code and/or associated Internet addresses thereof. For example, a first Internet address of the client is associated with a content that includes a HTML code linking to other websites of the client that, in turn, links back, or inlinks, to the first Internet address.

Figure 3:
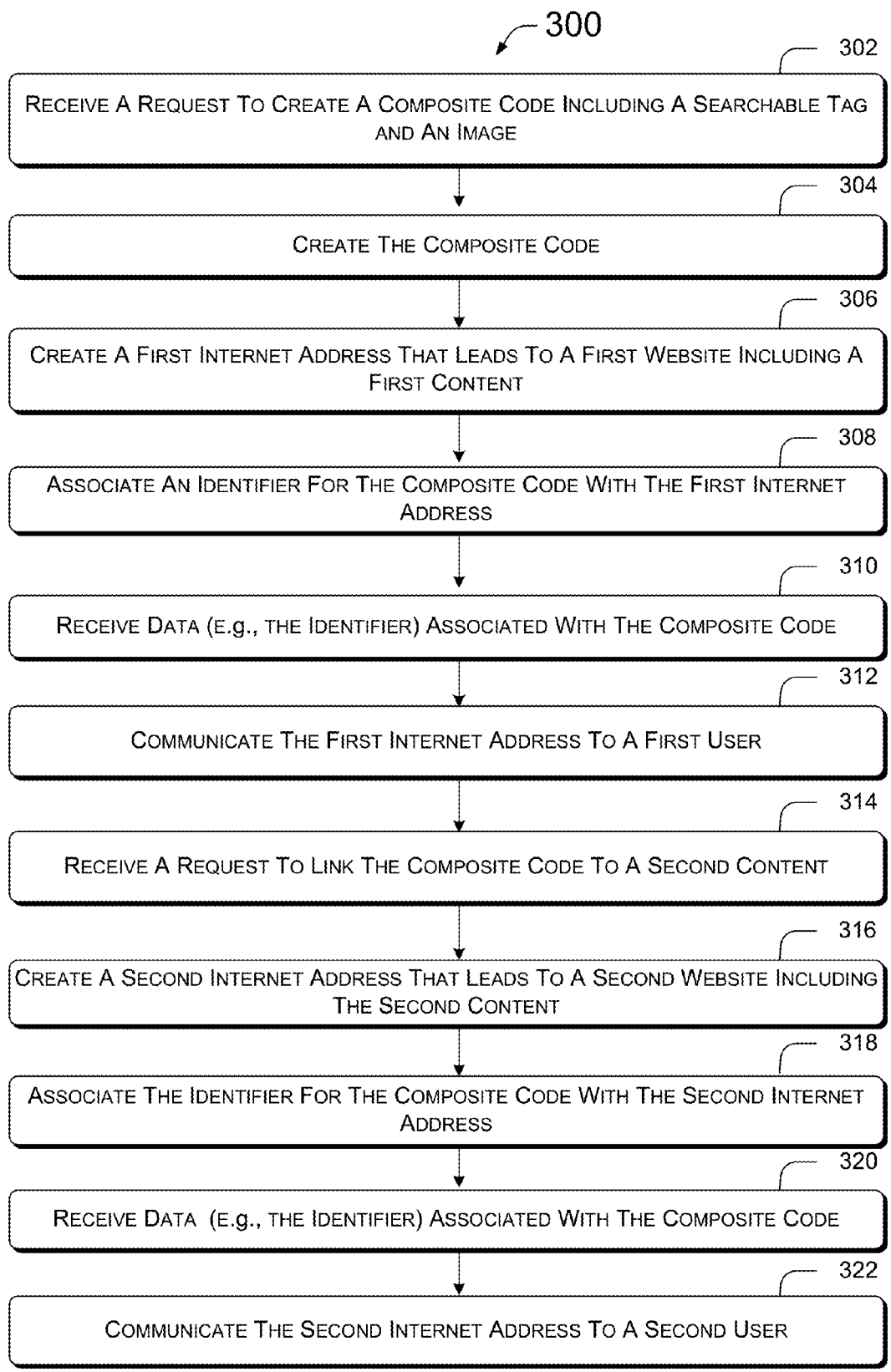
FIG. 3 summarizes methods and/or processes related to creating and linking composite codes.

Referring to FIG. 3, a flow chart summarizes an exemplary method 300 for accessing content on the Internet using a composite code that is dynamically linked to a plurality of Internet addresses. At step 302, a host computing device 106 receives a request to create a composite code including a tag or keyword and an image. Alternatively, or in combination, the request includes instructions to link a pre-existing composite code to a first content, such as website including a first real estate listing. In certain embodiments, the request is sent by a client using a first client computing device 102.

At step 304, the composite code is created. For example, the host computing device 106 generates a QR Code and includes the keyword within a proximity of the QR Code to create the composite code for the client. In certain embodiments, the composite code is configured to be readable by at least one of an image scanner and/or a radio frequency interrogator. Further at step 304, an identifier that also includes the keyword is associated with the composite code and stored in a relational database in association with the composite code. At step 306, a first Internet address is created that leads to a first website including a corresponding first content. At step 308, the identifier of the composite code is associated with the first Internet address, such as by associating the identifier that is a surrogate Internet address with the first Internet address in a relational database.

At step 310, the host computing device 106 receives data associated with the composite code, such as the identifier. For example, a first user computing device 116 of a user scans the composite code 202 and sends a transmission including a surrogate Internet address associated with the composite code 202 to the host computing device 106. At step 312, the host computing device 106 communicates to the first user computing device 116 the first Internet address, such as by redirecting the user computing device 116 to the first Internet address. The browser of the user computing device 116 then access the website associated with the first Internet address.

Figure 4:
FIGS. 4-11 illustrate screen shots of User Interfaces for rendering on a user computing device of FIG. 1.
Figure 5:
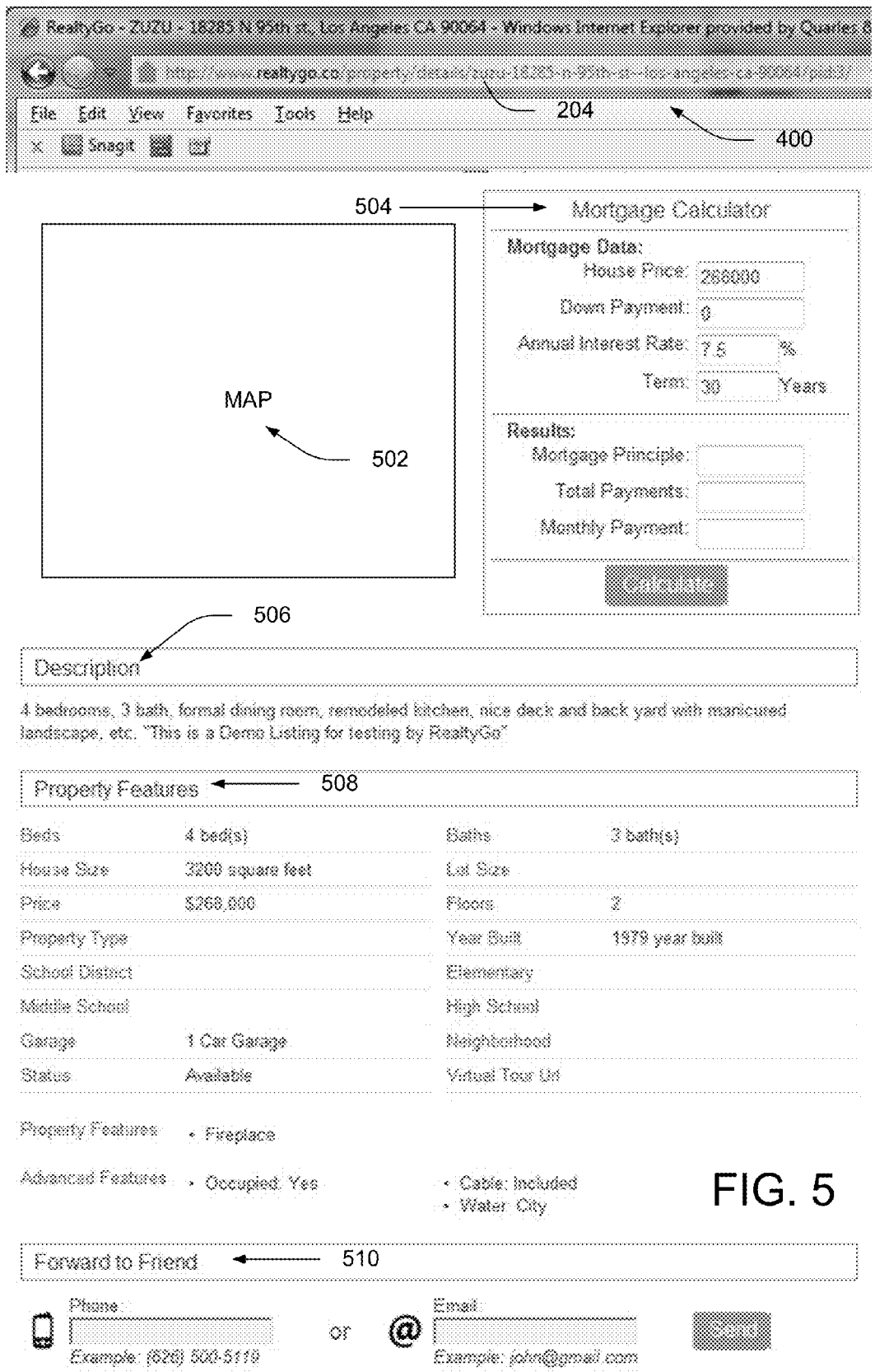

To illustrate, and referring to FIGS. 4 and 5, the composite code 202, including the keyword ZUZU 204, is linked to the first Internet address 400 of a first website that includes content about a first real estate listing 402. Here, the first website includes content such as a map of the listing 502, a mortgage calculator 504, a description of the real estate listing 506, property features 508, and query boxes that allow the content to be forwarded to other users 510. In certain embodiments the first website is interactive such that the user enters information, such as information for scheduling an appointment to meet a realtor to see the real estate featured on the website with the first Internet address. This entered information is then communicated to the host computing device 106 and/or the client via one or more of the client's client computing device 102.

Figure 6:
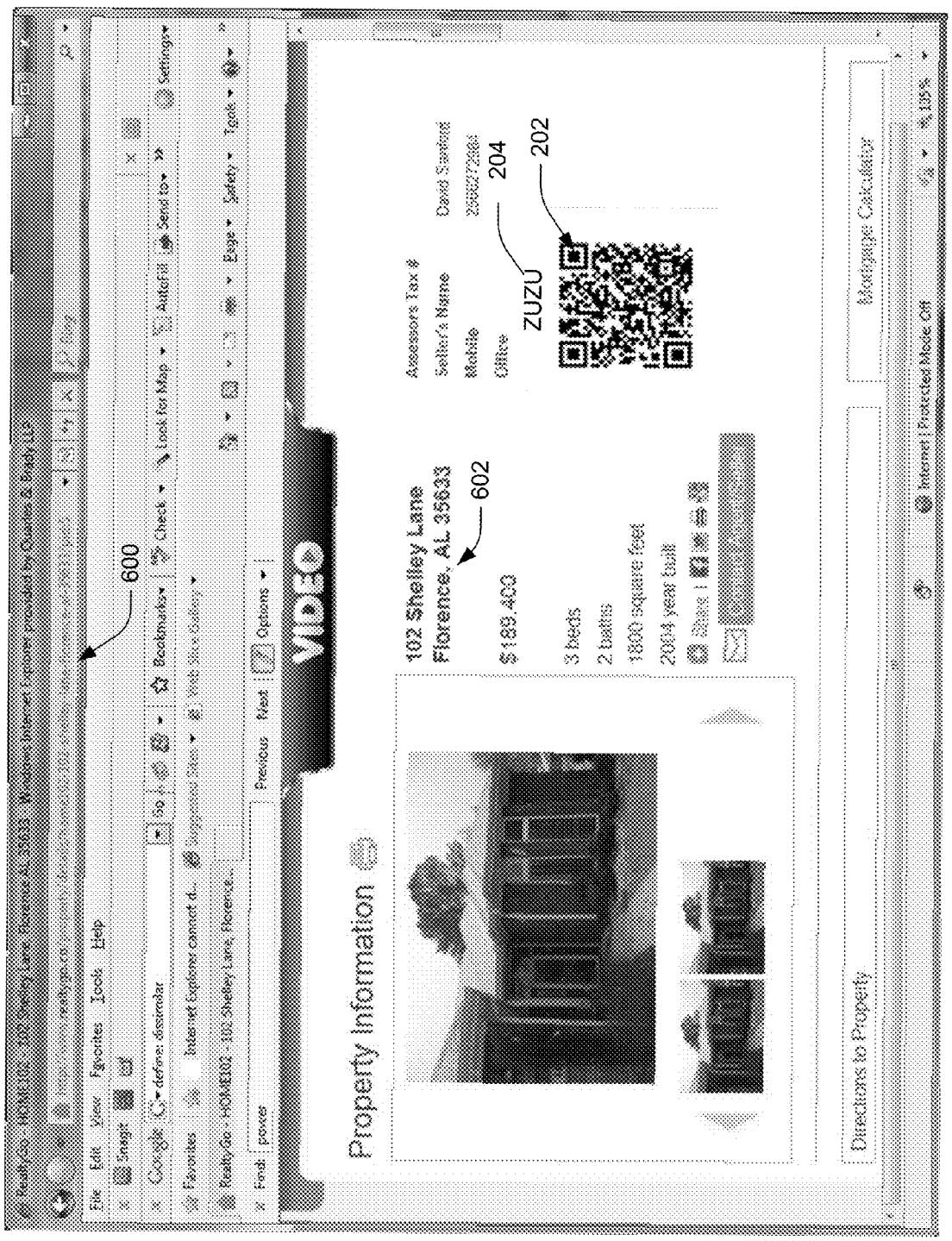

Referring back to FIG. 3, at step 314, the host computing device 106 receives a request to link the composite code to a second content, such as a different real estate listing. For example, the client sends the request to the host computing device 106 via a client computing device 102 of the client. At step 316, the host computing device 106 creates a second Internet address that leads to a second website including the second content. To illustrate, and referring to FIG. 6, the composite code ZUZU 202 is linked to a URL 600 that leads to a website including a second listing 602 and content related to the second listing 602.

At step 318, the host computing device 106 links the composite code to the second Internet address. At step 320, the host computing device 106 receives data associated with the composite code, such as the identifier which is the surrogate Internet address. Here, again one of the user computing devices 116 in FIG. 1 of a second user scans the composite code and sends the identifier to the host computing device 106. At step 322, the host computing device 106 communicates the second Internet address to the second user that sent the data in step 320. For example, in certain embodiments, the host computing device 106 redirects the user computing device 116 in FIG. 1 to the second Internet address.

In yet another example, a composite code including an image and a tag is associated with an identifier that also includes the tag. The identifier for the composite code is stored in a data repository, such as the data repository DB 112 of the host computing device 106. The identifier, in turn, is associated with each of a plurality of Internet addresses that lead to corresponding websites with corresponding content. For example, the host computing device 106 received the corresponding content for each of the websites from the client computing device 102.

In certain embodiments, the host computing device 106 creates the Internet addresses for each of the websites such that each of the Internet addresses includes the tag and a characteristic of the respective content of the corresponding website. For example, a first Internet address is created to include the tag and an address of a first real estate listing featured at the first website while the second Internet address is created to include the tag and an address of a second real estate listing featured in the second website.

The host computing device 106 then receives a transmission from the user computing device 116 that includes the identifier of the composite code. To illustrate, on Jul. 3, 2012, the user computing device 116 scans a composite code that includes a QR Code and a tag "ZUZU." Here, the identifier of the composite code is a surrogate URL such as: www.realtygo.com/ZUZU. The host computing device 106, in turn, uses the received identifier and a predetermined rule to select one of the Internet address from among the plurality of Internet addresses associated with the identifier. For example, the received surrogate URL is matched with a client profile stored at the data repository DB 158. Within the profile of the client is a predetermined rule that indicates that the first Internet address should be used with queries dated between July 2012 and August 2012 while the second Internet address should be used with queries dated after August 2012. In this example, because the identifier was received on Jul. 3, 2012, the first Internet address is selected. The host computing device 106, in turn, redirects the user computing device 116 to the first Internet address. Alternatively, if the host computing device 106 receives the identifier www.realtygo.com/ZUZU after August 2012, the host computing device 106 would use the identifier and the predetermined rule to select the second Internet address because the query was received after August 2012. Here, the host computing device 106 would redirect the user computing device 116 to the second Internet address.

In certain embodiments, the host computing device 106 keeps a log of information received from and/or about the client computing device 102 and/or the user computing device 116. In certain embodiments, the information from and/or about the client computing device 102 includes a client profile, content for various websites (e.g., past or presently "live" website), marketing strategies, . . . etc and the information from the user computing device 116 includes a frequency of access requests, a locality of the user computing device 116 based on a corresponding IP or GPS information received from the user computing device 116, or other information. In certain embodiments, the logged information is stored in the data repository DB 112 and mined For example, a success or return of investment of various marketing campaigns may be evaluated by determining a frequency of use of a composite code from a particular locality targeted by the client in a corresponding marketing strategy.

In another embodiment, predetermined behavior of the user is promoted via a rewards program linked to the marketing strategy of the client. To illustrate, a user is be awarded points for repeatedly using a composite code to access websites of a client.

In certain embodiments, the client uses the client computing device 102 to create an Internet profile designed for SEO. The profile includes, for example, a recent contact information for the client (e.g., address, phone number, website . . . etc.) and multiple links to the client's presence on the web, such as URL links to social networking sites of the client. This aggregation of the links to the client's presence on the web provides an increased relevance to the client's profile for Internet search result ranking purposes because the chronologically recent entries to such social networking sites provides SEO.

In certain embodiments, Applicant's computer readable program code 115 profile saves the data in the profile in the data repository DB 118 of the host computing device 106 in FIG. 1. The data is, in turn, is included in a website that is accessible via an Internet address. For example, the client uses the client computing device 102 to enter the data into the data repository DB 118 via the communication fabric 104, which is, in turn, saved in the data repository DB 118.

In some embodiments, the keyword or tags of the client is used to reference the profile for SEO. For example, in FIG. 7 the keyword ACME 11 is associated with the composite code 710 for client ACME. In some embodiments, the client's composite code leads to the client's profile stored on the host computing device 106. Referring to FIGS. 1 and 7, if the user scans the composite code 710 or the clicks on the hyperlinked composite code 710, the website including the data from ACME's profile is rendered on the user computing device 116 of the user.

In certain embodiments the keyword is included in the URL address of the client's profile. In FIG. 7, the URL 730 includes the keyword ACME 11 and descriptors of the profile "www.qrACMEtag/OlymipicBLVd-LA-CA/lawyer/LA-Bar-Admission/A-rating/patent-attorney/speaker" for client ACME. Consequently, in some embodiments, the URL of the profile takes the form of: "www.qr[KEYWORD or TAG METADATA]tag[VARIABLE].[TLD].".

Referring now to the content of the profile rendered on user interface 700 of FIG. 7, the profile includes the address 740, a description (not shown), a link to a mobile site 702, and a link to a full web site 704 of ACME. As stated previously, the profile also includes links for various contact venues of the client 728, such as: Social Media 713, Blog 712, Email 714, Website 716, Phone 718 of ACME, each of which is be kept current by the client ACME.

The Social Media 713 and Blog 712 data of ACME rendered on the user interface 700 includes hyperlinked icons of ACME's social networking sites that each lead to respective URL's for ACME's: presence 730 designated with the trademark of Facebook, presence 732 designated with the trademark of Twitter, presence 734 designated with the trademark of Blogger, presence 736 designated with the trademark of Linkedin, presence 738 designated with the trademark of Yelp, and presence 744 designated with the trademark of Wikipedia. Other such Internet presence are also contemplated such as iTunes presence, or StumbleUpon presence, for example.

In certain embodiments, the content of the Internet address dynamically linked to the composite code is updated for SEO and to include current data that is relevant to users. Here, the client updates the data stored in association with the client's profile. For example, if the client has an old company website 716 www.acme.net which is then updated to a new website www.acme.com, the client updates the profile data to replace the old website with the new website.

In certain embodiments, the user can send an alert to the client informing the client that its data within the profile is not current. In the above example, if a user clicks the old website 714 www.acme.net listed in the profile, which leads to an empty website, a window pops up (not shown) to give the user the option to the user to inform the client that the data within the profile is old. To illustrate, the pop up window gives the user an option to email, tweet, SMS, or provide a voice message to the client using the user's email, Facebook, or Twitter accounts to communicate with the client's email, Facebook or Twitter accounts, thereby indicating that the profile has the old website 714.

Figure 8:
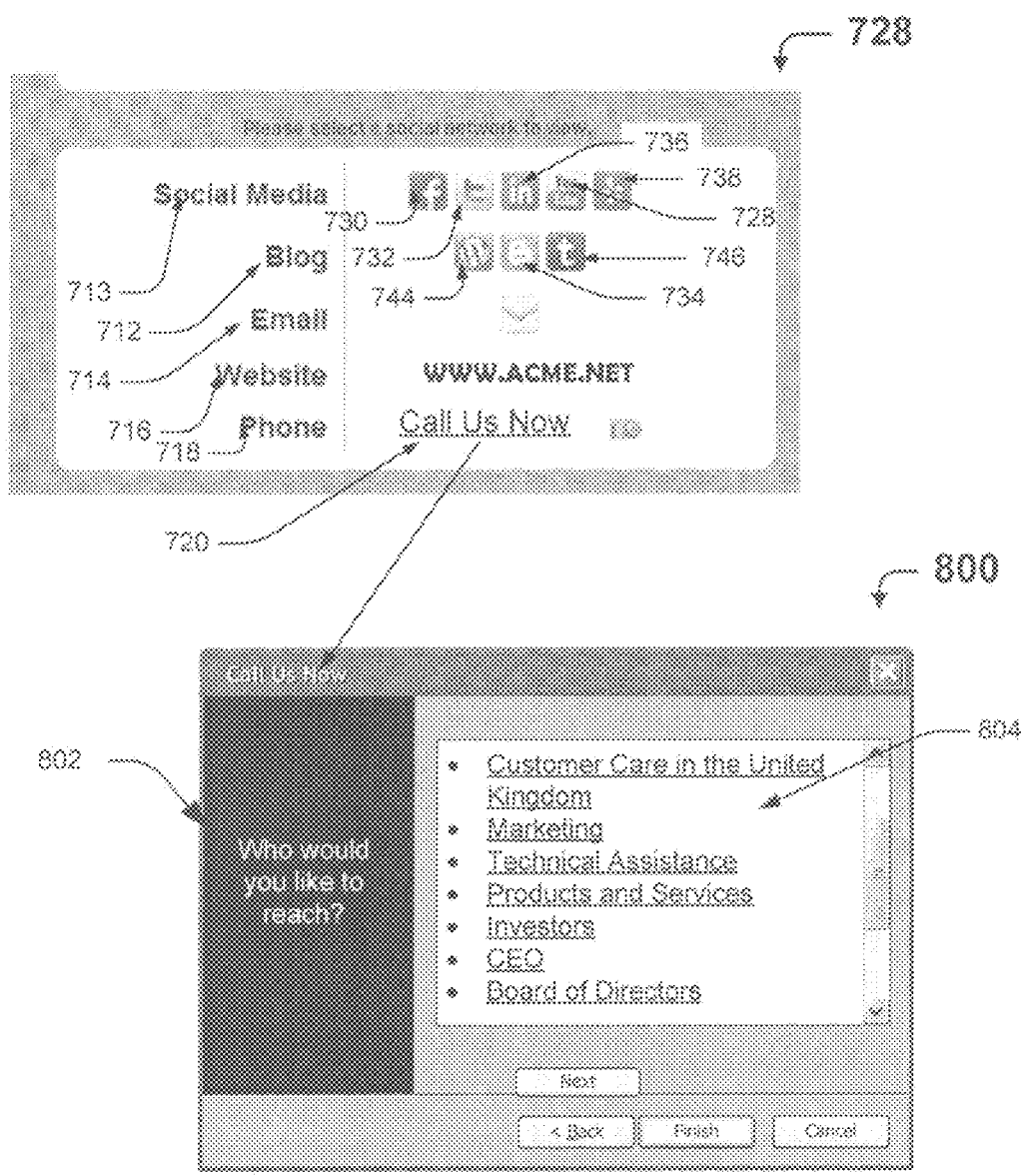

In certain embodiments, the client profile includes a phone directory of the client along with rules that are used to provide menuing to the user. Referring to FIG. 8, the contact venues of the client 728 of FIG. 7 is shown including the phone 718 option. Here, when the "Call Us Now" 720 hyperlink is clicked, a pop up window 800 provides options 802 for verbal communication with the client. The user, in turn, selects one of the verbal communication venues 804 and is then given the appropriate phone number to call. Alternatively, or in combination, the user is connected, in real-time, to the selected verbal communication venue 804. To illustrate, a voice over IP system is used to connect the user's user computing device 116 (e.g., smart phone) to the client's client computing device 102 (e.g., land telephone) via the communication fabrics 104 and 114, respectively.

In certain embodiments, the host computing device 106 tracks the messages that it routes through to the client. For example, the time, place of call origin, place of call destination, duration of call, frequency of connections to a particular phone number . . . etc. are logged and tracked. The tracked data can then be mined for the client's marketing purposes and return on investment analyses.

Figure 9:
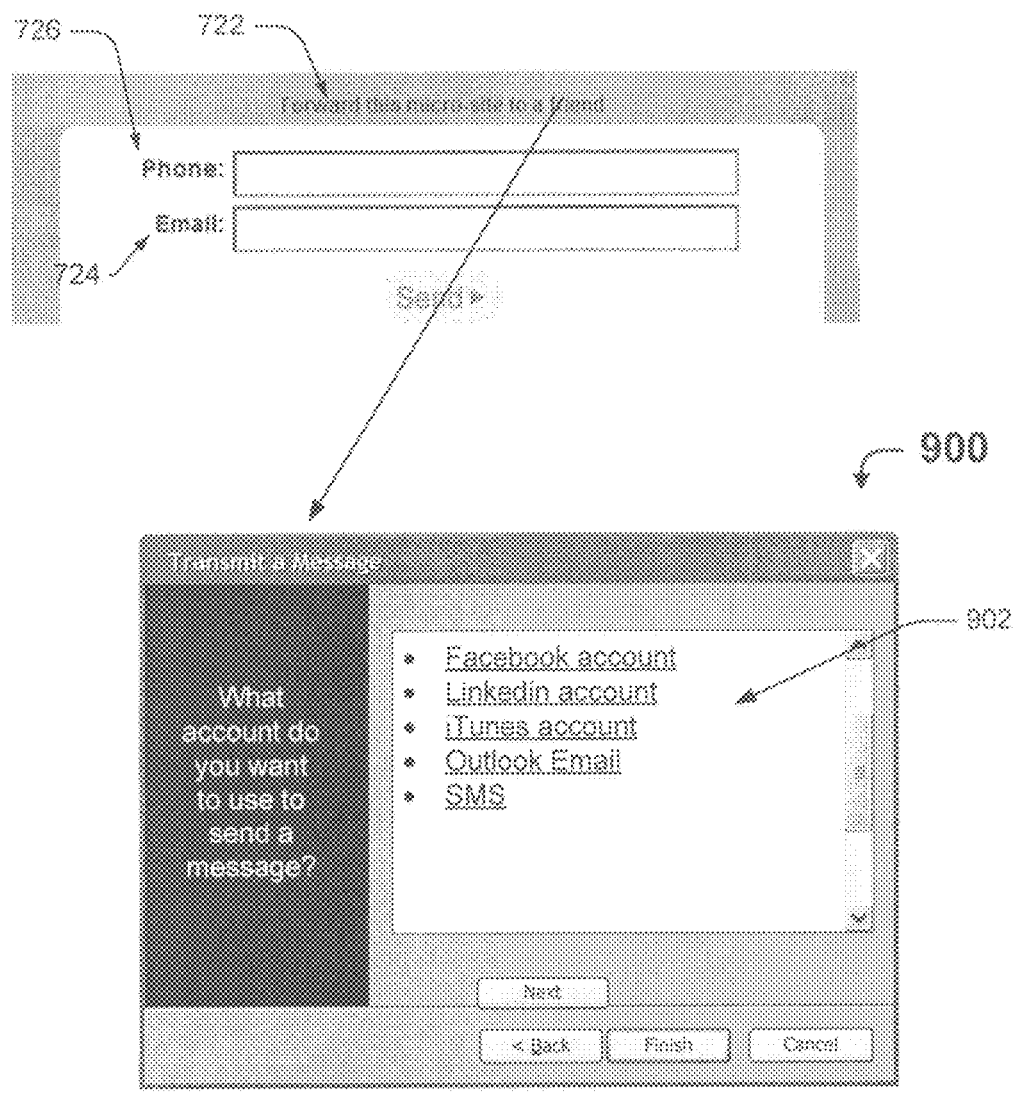

In certain embodiments, the user also has the option to communicate with other users. Referring to FIG. 9, the user comment box 722 of FIG. 7 is illustrated. Here, the user has the option to enter a phone number 726 or an email address 724 of a message recipient in order to send the profile to the message recipient (e.g., "friend"). Alternatively, or in combination, the user has the option to send a message to the message recipient using any of a the user's accounts 902 via the pop up window 900.

Figure 10:
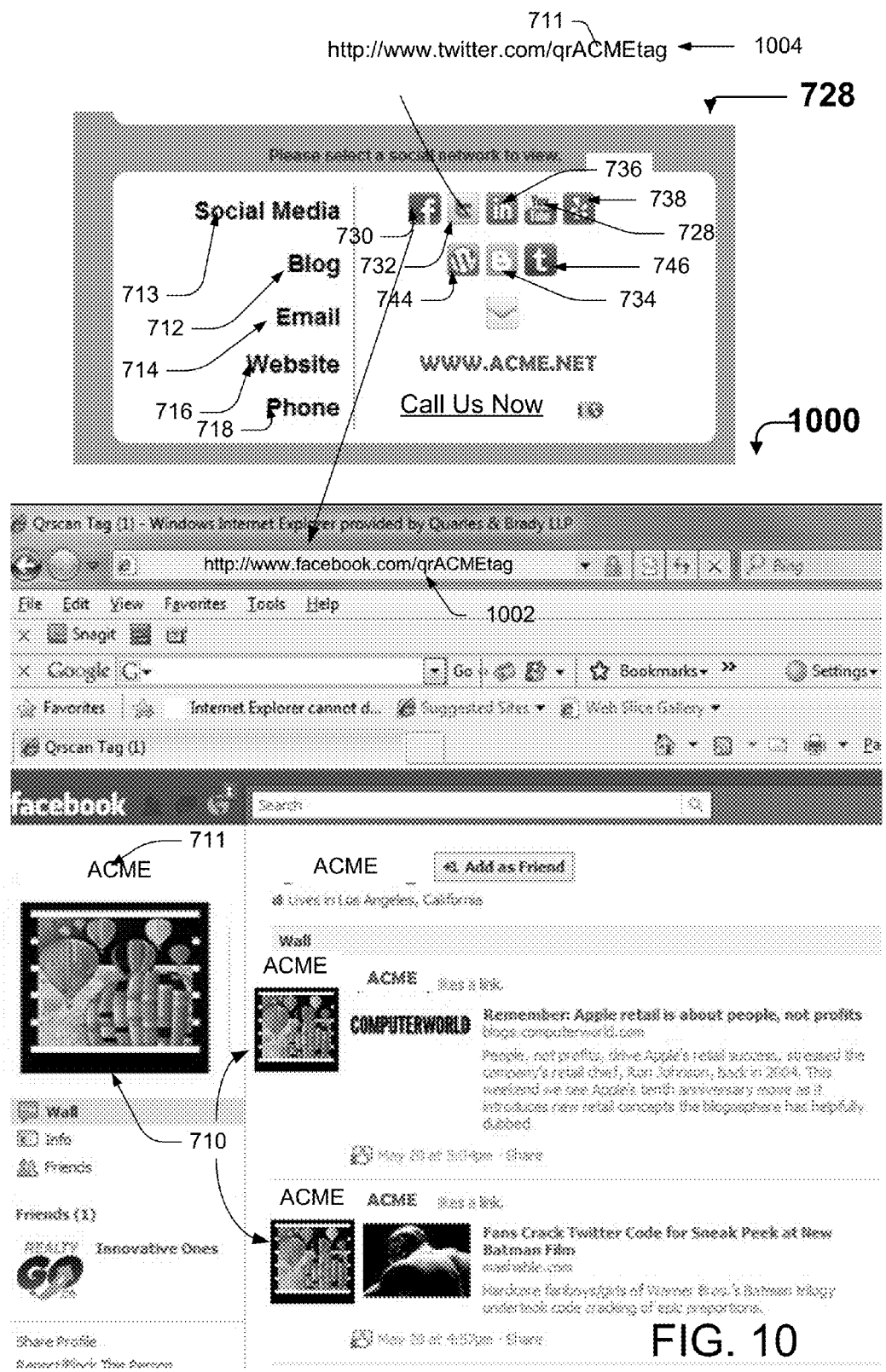

In certain embodiment, the client's composite code is used as the identification picture within the client's social networking sites. Referring to FIG. 10, a portion of user interface 700 of FIG. 7 that includes the contact venues 728 is shown. Here, when the user clicks the client's hyperlinked icon for Facebook, the client's Facebook® website is rendered as user interface 1000. Here, the composite code 710 for client ACME is included in each entry of the client. As stated previously, if the composite code 710 is scanned or selected, the user is lead to the profile website of the client (e.g., URL 730 of FIG. 7).

In certain embodiments, in order to provide SEO of the client's profile, the keywords and/or tag metadata of the client is consistently included in the respective URL's of the client's social networking sites linked within the client's profile. In FIG. 10, the keyword or tag metadata ACME 711 is included in the client's Twitter social networking URL (www.twitter.com/qrACMEtag 1004) and Facebook® social networking URL (www.facebook.com/qrACMEtag 1002). The consistent use of the keyword or tag metadata within the URL addresses of the client's social networking sites (e.g., Social Media 713 and Blog 712) increases the ranking of the client's profile within search results of Internet search engines.

Figure 11:

In certain embodiment, a plurality of client profiles stored in the data repository DB 118 is accessible as a searchable directory that is accessible via a global network, such as the Internet. Referring to FIG. 11, a searchable directory 1102 is rendered on the client computing device 116 via user interface 1100. Here, an Internet browser is used to render a webpage via a URL with a top-level domain name of www.qr-scantag.com 1124. The user enters search terms within the search query box 1104 to find relevant client profiles (e.g., "'Thai food' and 'Los Angeles'"). Alternatively, or in combination, the user enters category search terms within a category query box 1106 (e.g., "restaurant"). Other search query methods are also contemplated (e.g., sub-category query box . . . etc. or Category menuing such as Category 1108).

The host computing device 106 utilizes the user's search terms/categories to retrieve relevant client profiles stored within the data repository DB 118. The search results are rendered on the user interface 1100, shown as search result: client RealtyGo 1110; client ACME 1112; and client ACME 1114.

The format and ranking of the search results can be based on predetermined business rules. For example, the ranking is be based on: a degree of matching between the search term and the data in the respective profile; the frequency of entries to respective social networking sites; the amount of times the profile has been viewed by other users; a GPS location of the user computing device 116 accessing the searchable directory; or a user's profile stored at the data repository DB 118 . . . etc. To illustrate, if the GPS capabilities of a user computing device 116 indicated that the user computing device 116 is located in Beijing China, the search results for the query "restaurant" will provide only Beijing restaurants. Moreover, if the user's profile stored on at the data repository DB 118 indicates that all search results should be displayed in the German language, then the list of Beijing restaurants will be in the German language.

In some embodiments, the search results includes a synopsis of the profiles of the respective clients. For example, the synopsis includes one or more composite code (e.g., composite codes 710, 1118, and 1120 of client ACME in FIG. 11), a client logo (e.g., logo 1122 of RealtyGo), name, address, phone, summary, and hyperlinked social networking icons of the respective clients.

In certain embodiments, each synopsis can also include tools for the user. As shown in FIG. 11, the user can use the tools to email 1128 the corresponding profile to a message recipient; share 1130 the profile with another user; render a map 1132 showing a geographic location of the respective client; or view similar clients 1134. For example, selection of the similar clients 1134 tool under the profile of the client RealtyGo 1110 results in a list of client that have characteristics in common with client RealtyGo 1110, such as other clients that have similar keywords, tags, categories, frequency of postings on respective social networking sites, descriptions, geographic locations . . . etc.

In certain embodiments, the synopsis of the respective client profiles includes a Like 1116 tool. Here, the user can vote in favor of the profile. The amount of "like" votes is then logged, tracked, and/or counted. Client profiles with higher "like counts" can result in SEO within the directory and/or for other Internet search engines.

In certain embodiments, the corresponding client profiles are accessible via corresponding URL's with sub-level domains, such as www.qrscantag.com/ACME (not shown), for example. Alternatively, the URL addresses of websites that include data from the client profiles have their own respective top-level domain names. In one example, in order to maintain consistency among client profiles and to improve the SEO of the directory the top-level domain names of the clients each begin with a common prefix, such as "qr" and/or suffix such as "tag" (e.g., the directory at www.qrscantag.com). Here, because the English language does not include any words including the sequence of text "qr," such URL addresses will be unique.

Clients can also use the searchable directory to survey an industry. For example, client RealtyGo 1110 can conduct a search using search words relevant to its industry (e.g., "realtor"). The search results include RealtyGo's competitor's profiles including the competitor's up-to-date contact information and links to its web presence (e.g., links to recent entries on the competitor's social networking sites).

The described features, structures, or characteristics of the invention are combinable in any suitable manner in one or more embodiments. In the above description, numerous specific details are recited to provide a thorough understanding of embodiments of the invention. One skilled in the relevant art will recognize, however, that in certain embodiments the invention is practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as a logical flow-chart diagram (e.g., FIG. 3). As such, the depicted order and labeled steps are indicative of one embodiment of the presented method. In certain embodiments, other steps and methods are conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types are be employed in the flow-chart diagrams, they are understood not to limit the scope of the corresponding method (e.g., FIG. 3). Indeed, some arrows or other connectors may be used to indicate only the logical flow of the method. For instance, an arrow indicates a waiting or monitoring period of unspecified duration between enumerated steps of the depicted method. Additionally, the order in which a particular method occurs may or may not strictly adhere to the order of the corresponding steps shown.

In certain embodiments, individual steps recited in FIG. 3 are be combined, eliminated, or reordered. In certain embodiments, the computer readable program code described reside in any other computer program product, where that computer readable program code is executed by a computer external to, or internal to, system 100 (FIG. 1), to perform one or more of steps recited in FIG. 3. In either case, in certain embodiments, the computer readable program code is be encoded in a non-transitory computer readable medium comprising, for example, a magnetic information storage medium, an optical information storage medium, an electronic information storage medium, and the like. "Electronic storage media," means, for example and without limitation, one or more devices, such as and without limitation, a PROM, EPROM, EEPROM, Flash PROM, compactflash, smartmedia, and the like.

Examples of computer readable program code include, but are not limited to, micro-code or micro-instructions, machine instructions, such as produced by a compiler, code used to produce a web service, and files containing higher-level instructions that are executed by a computer using an interpreter. For example, embodiments are be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, multiple, distributed qualification processing systems can be configured to operate in parallel.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

I claim:

1. An article of manufacture comprising a processor and a non-transitory computer readable medium having computer readable program code encoded therein to access content on the Internet, the computer readable program code comprising a series of computer readable program steps to effect:
storing an identifier for a composite code in a database, wherein the composite code includes an image graphically encoding the identifier and a keyword, and the identifier includes the keyword;
associating the identifier with each of a plurality of Internet addresses, each one of the plurality of Internet addresses leading to a corresponding website that includes a corresponding content;
storing a plurality of rules, each rule in the plurality of rules associating each one of the plurality of Internet addresses with a date range and a location;
receiving, from a computing device of a user, the identifier and a location of the computing device; and
selecting, using the identifier, the location of the computing device, and a current date and the plurality of rules, one of the Internet addresses from the plurality of Internet addresses.

2. The article of manufacture of claim 1, wherein the computer readable program code further comprising a series of computer readable program steps to further effect:
receiving each of the corresponding content for each of the corresponding websites; and
determining the Internet address for each of the corresponding websites, wherein each of the Internet addresses comprises the keyword and a corresponding characteristic of the respective said content of the corresponding website.

3. The article of manufacture of claim 1, wherein the computer readable program code further comprising a series of computer readable program steps to further effect:
associating the identifier with a phone number; and
after receiving, from the computing device of the user, the identifier, transmitting the phone number to the computing device of the user to dial the phone number.

4. The article of manufacture of claim 1, wherein the computer readable program code further comprises a series of computer readable program steps to further effect redirecting the computing device to the one of the Internet address selected from the plurality of Internet addresses.

5. A method for associating a composite code to a plurality of Internet addresses, the method comprising:
storing, at a processor, an identifier for a composite code, wherein the composite code includes an image and a keyword, and the identifier includes the keyword;
creating, at the processor, a first Internet address that comprises the keyword and a first characteristic of a first content of a first website, and leads to the first website;
creating, at the processor, a second Internet address that comprises the keyword and a second characteristic of a second content of a second website, and leads to the second website;
storing a plurality of rules, each rule in the plurality of rules associating one of the first Internet address and the second Internet address with at least one of a date range and a location;
receiving, at the processor, a first transmission from a user computing device, the first transmission including the identifier and a location of the user computing device;
using, at the processor, the identifier, the location of the user computing device, and a current date, and the plurality of rules to select one said Internet address from among the first Internet address and the second Internet address; and
forming, at the processor, a second transmission for delivery to the user computing device, the second transmission redirecting the user computing device to the selected said Internet address.

6. The method of claim 5, further comprising configuring the composite code to be readable by at least one of an image scanner and a radio frequency interrogator.

7. A computer program product encoded in a non-transitory computer readable medium and useable with a programmable processor to link a composite code to a plurality of Internet addresses, the computer program product comprising:
computer readable program which causes said programmable processor to store an identifier for a composite code, wherein the composite code includes an image and a keyword, and the identifier includes the keyword;
computer readable program which causes said programmable processor to determine a first Internet address that comprises the keyword and a first characteristic of a first content of a first website, and leads to the first website;
computer readable program which causes said programmable processor to determine a second Internet address that comprises the keyword and a second characteristic of a second content of a second website, and leads to the second website;
computer readable program which causes said programmable processor to store a plurality of rules, each rule in the plurality of rules associating one of the first Internet address and the second Internet address with at least one of a date range and a location;
computer readable program which causes said programmable processor to receive a first transmission from a user computing device, the first transmission including the identifier of the composite code and a location of the user computing device;
computer readable program which causes said programmable processor to use the identifier, the location of the user computing device, and a current date, and the plurality of rules to select one said Internet address from among the first Internet address and the second Internet address; and
computer readable program which causes said programmable processor to form a second transmission, for delivery to the user computing device, including the selected said Internet address.

8. The computer program product of claim 7, wherein the computer program product further comprises computer readable program which causes said programmable processor to configure the composite code to be readable by at least one of an image scanner and a radio frequency interrogator.

* * * * *